June 12, 1951 R. F. TABER 2,556,605
PLASTIC SHEET CREASING MACHINE
Filed Feb. 6, 1947 3 Sheets-Sheet 1
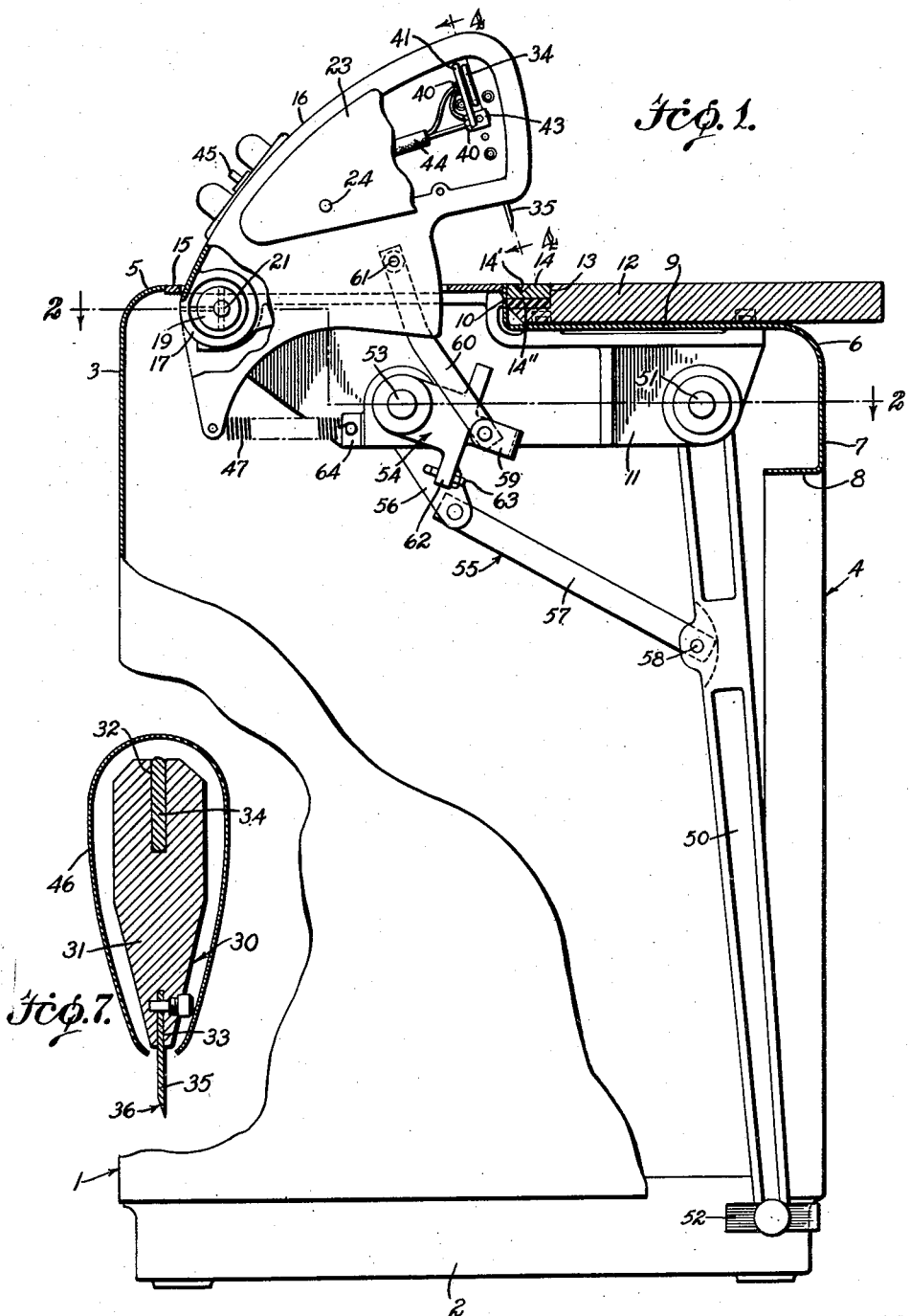
INVENTOR
Ralph F Taber
BY
ATTORNEY

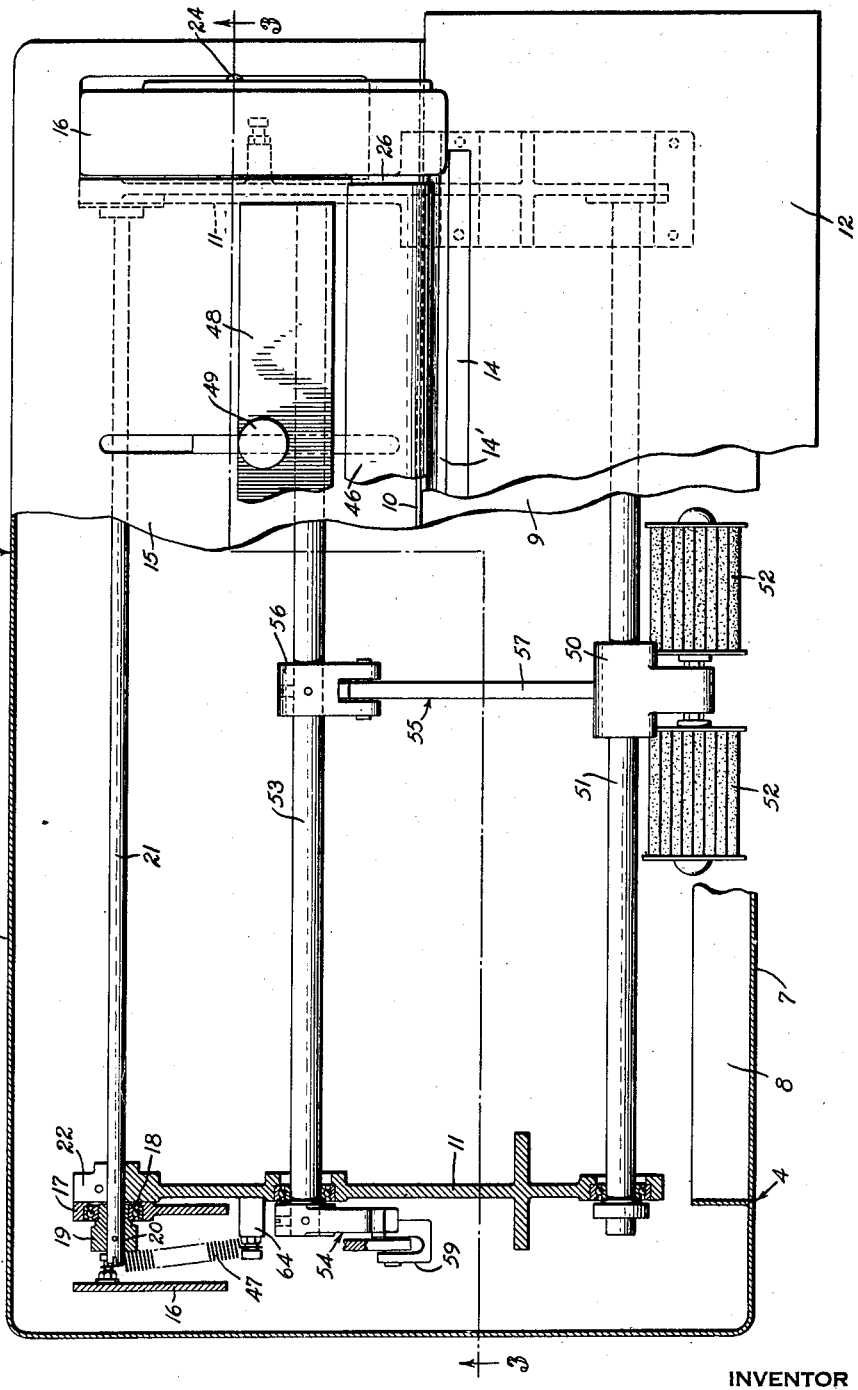

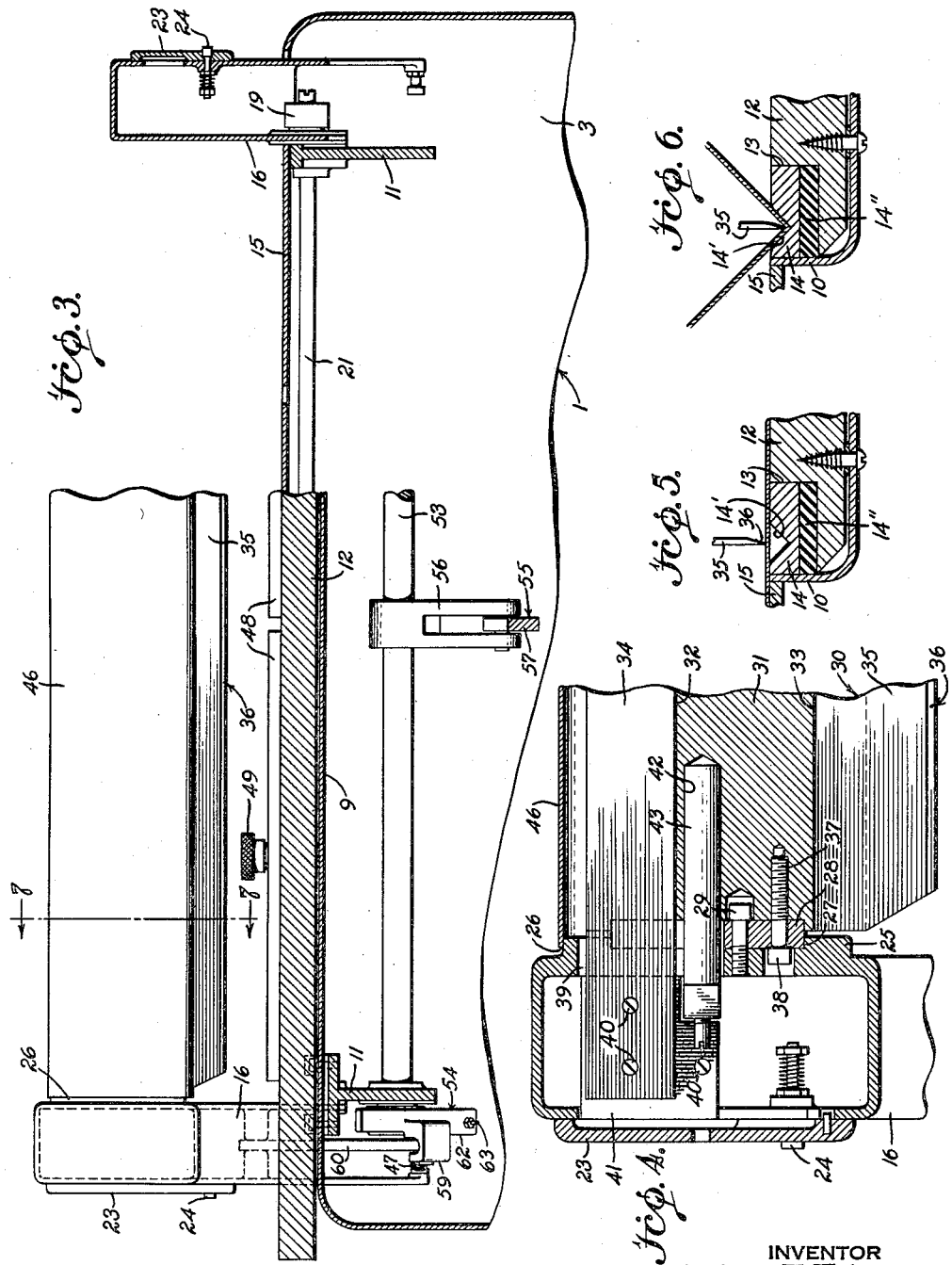

Patented June 12, 1951

2,556,605

UNITED STATES PATENT OFFICE 2,556,605

PLASTIC SHEET CREASING MACHINE

Ralph F. Taber, Buffalo, N. Y., assignor to Taber Instrument Corporation, North Tonawanda, N. Y., a corporation of New York Application February 6, 1947, Serial No. 726,917

13 Claims. (Cl. 18—19)

This invention relates to a machine for folding sheet material, particularly the creasing of plastic sheet material, such as celluloid and the like, which is capable of being permanently shaped with the aid of heat.

The invention provides a machine for forming plastic sheet material having a pair of cooperative forming members and means initially operable to rapidly move said members toward each other to begin a forming operation and subsequently slowly move said members in cooperative relation during the forming operation.

The invention provides a creasing machine for plastic sheet material adapted for rapid and economical operation; a machine having a movable creasing blade for cooperation with a creasing pad in which the movable blade is operable rapidly in preliminary movement toward the pad with subsequent slow movement during the creasing operation to facilitate convenient and rapid operation of the machine in creasing sheet material; a machine wherein the rapid movement of the creasing blade toward and from the creasing pad and the slow movement during the creasing operation is obtained by a substantially uniform movement of an operating lever; a machine wherein the movable creasing blade provides rapid movement of the blade toward and from a creasing pad, slow movement during the creasing operation in cooperation with the pad, with a leverage mechanism for securing this operation in which the operating lever has a uniform movement during the variable feed movement of the blade and obtains substantial pressure during the creasing operation in cooperation with the pad through the use of a lever mechanism having a pivot for part of the linkage moving into a substantially dead center position in the full creasing position of the creasing blade with the pad; and a machine having pivoted blade supporting arms carrying a creasing blade on the free ends thereof with suitable means for adjusting the position of the pivot mounting for the arms relative to a creasing pad with which the blade cooperates in creasing plastic sheet material.

The invention further provides a machine having a creasing blade assembly in which blade supporting arms carry the creasing blade in laterally extending relation therebetween, the creasing blade assembly having a holder secured at opposite ends to the blade supporting arms, the holder having recesses in opposite margins for receiving a heating member in one recess and the marginal portion of a creasing strip in the other recess to provide a rigid non-flexible creasing blade structure adapted to be conveniently heated through connections supplied to the heating member through one of said arms; a machine having a creasing blade assembly in which an imperforate guard embraces the holder for the creasing strip in spaced relation, is secured at opposite ends to the blade supporting arm and has a slot extending longitudinally thereof through which the creasing strip extends to provide a free marginal portion for creasing cooperation with a creasing pad; a machine having a creasing pad for cooperation with an oscillating creasing blade in which the creasing pad is resiliently supported to provide for movement of the pad under pressure by the creasing blade with sheet material to be creased therebetween for cooperation sufficient to bend the sheet material to be formed about the edge of the blade with portions at opposite sides of the blade in angularly extending relation to each other; and other features of construction and assembly that cooperate to provide an inexpensive and efficient plastic creasing machine.

In the drawings:

Fig. 1 is an end elevation of the plastic creasing machine with portions broken away and shown in section for convenience in illustrating details of construction.

Fig. 2 shows the left-hand end of the machine in horizontal cross-section taken substantially on the line 2—2 of Fig. 1 while the right-hand end of the machine is illustrated in plan view.

Fig. 3 is a vertical longitudinal cross-section taken on line 3—3 of Fig. 2.

Fig. 4 is an enlarged detail cross-section taken on line 4—4 or Fig. 1.

Fig. 5 is an enlarged diagrammatic cross-section showing the creasing blade engaged with a flat sheet in position over the creasing pad at the beginning of the folding operation.

Fig. 6 is an enlarged diagrammatic cross-section showing the creasing blade in full fold forming position in cooperation with the creasing pad and the sheet in folded relation therebetween.

Fig. 7 is an enlarged detail cross-section taken on line 7—7 of Fig. 3.

The machine has a base generally indicated at 1 formed of several sections suitably welded or otherwise secured together. The base has a pair of spaced shoes 2 arranged at the ends of the machine. A main body member 3 is formed to provide a rear wall and end walls mounted on shoes 2 with the front ends extended inwardly, as indicated at 4, to form front corner portions leaving the front between the end walls open. The angular front corner portions 4 with the U-shaped structure of body member 3 to form the rear and end walls, provides a rigid base construction in cooperation with shoes 2. The upper edge of the rear wall of body member 3 is curved forwardly as indicated at 5 at the top of the base.

A front top member 6 has a front wall portion 7 extending transversely across the upper front portion of the machine between the upper end of the end walls formed by body member 3. The ends of member 6 are welded or otherwise rigidly secured to the upper ends of the end walls at the front portion of body member 3 to provide a rigid structure. The lower edge of front wall portion 7 has a rearwardly etxending flange 8, as shown in Fig. 1. Front top member 6 has a top wall portion 9 extending rearwardly from the curved upper edge of front wall portion 7 thereof, as clearly shown in Fig. 1. Top wall portion 9 terminates at the rear edge in an upwardly extending flange 10. This entire structure is welded at opposite ends or otherwise rigidly secured to body member 3 and cooperates to form a rigid base structure.

A pair of supporting members 11 are arranged in spaced parallel relation to each other and the end walls of body member 3 and have the front upper end portions thereof secured to top wall portion 9 near the end walls of the base, as clearly shown in Figs. 1 and 2. Supporting members 11 have upwardly offset rear end portions extending above the front end portions, as shown in Fig. 1, from the rear face of upwardly extending flange 10 to the rear ends of members 11 adjacent the rear wall of the base. These supporting members cooperate with top wall portion 9 and front top member 6 to provide a rigid top structure for the machine.

A work table 12 of suitable material, such as wood or the like, is mounted above front top member 6 over the upper face of top wall portion 9 with the rear edge engaging the front face of upwardly extending flange 10, as clearly shown in Fig. 1. Table 12 extends throughout the length of the machine from end-to-end thereof and has the front edge extending forwardly beyond front wall portion 7, as shown in Fig. 1. The upper face of table 12 terminates in the same horizontal plane with the upper edge of flange 10 and is formed at the rear edge in cooperation with and adjacent flange 10 with a channel 13 providing a seat for receiving a creasing pad 14. The creasing pad 14 is formed of a metal bar having a groove in the upper face to form angular walls 14' arranged at the angle of the fold desired in the sheet to be folded or creased. The upper portion of creasing pad 14 lies in a position about even with the upper face of work table 12. Creasing pad 14 is supported on a resilient strip 14" that is compressible to provide for limited movement of pad 14 when the creasing blade engages a sheet in the groove in full folding position under pressure.

A top plate 15 is mounted on the upper rear portion of supporting members 11 to extend from the rear upper edge of flange 10 to the upper edge of curved portion 5 on the rear wall of body member 3 to form a closure for the upper portion of the machine, and additionally to rigidly connect supporting members 11. Top plate 15 is formed with openings adjacent opposite ends thereof to receive tubular blade supporting arms 16.

Each arm 16 is formed of a tubular casting of irregular shape having some of the portions thereof formed and arranged in opposed relation. Each arm has the lower rear end open and provided with an apertured bearing portion 17 carrying a ball bearing assembly 18 mounted on a bearing sleeve 19 having an eccentric bore 20 therein slidably receiving bearing rod 21 mounted in the bifurcated rear bearing portion 22 of one supporting member 11. Bearing sleeve 19 has a transversely extending pin or other suitable means extending therethrough for locking it in position on bearing rod 21. A bolt or the like is threaded in bifurcated rear bearing portion 22 of each supporting member 11 for drawing the bifurcated portions toward each other to engage and hold rod 21 against rotation therein. If desired, threaded set screws may be used in place of transverse pins for retaining bearing sleeves 19 on bearing rod 21, so that the eccentric position of one bearing sleeve 19 on rod 21 may be adjusted with respect to the other to vary the relative pivot position for each arm with respect to the other and the base.

The outer side wall of each tubular arm 16 is formed with an opening to provide access to the interior of the arm and has a cover plate 23 pivotally mounted on the outer side of the arm below and near the rear portion of the opening therein, as indicated at 24, for normally closing the opening.

The forward portion of each tubular arm is formed on the inner side with an inwardly projecting boss 25 formed at the outer edge to provide a guard mounting seat, indicated at 26, and a blade mounting seat at 27. An insulating plate 28 is engaged in seat 27 and detachably secured therein by suitable securing screws 29 extending through insulating plate 28 and threaded in the inner side wall of each arm.

A creasing or folding blade assembly, generally indicated at 30, has a holder 31 formed with longitudinally extending slots 32 and 33 in opposite margins thereof to receive a heating member 34 in slot 32 and a creasing strip 35 with one margin engaged in slot 33 and rigidly secured therein by set screws or the like. The opposite margin of creasing strip 35 extends outwardly from holder 31 and has the free edge provided with a beveled portion 36 arranged with the edge of the creasing strip to provide a forming edge thereon to form plastic sheet material in a manner to be hereinafter described.

The ends of holder 31 are provided with threaded sockets 37 for threadedly receiving securing screws 38 extended through insulating plates 28 and having the enlarged heads thereon mounted in apertures in the side walls of arms 16 in spaced relation to the side walls, as shown in Fig. 4. This mounting rigidly secures the creasing blade in laterally extending relation between and to the arms through the medium of insulating plates 28 arranged so that heat transmission between holder 31 and arms 16 is materially reduced. The arrangement of securing screws 29 and 38 is such that metallic contact between metal parts engaged with the arms and metal parts engaged with holder 31 is avoided and the screws mutually engage only the insulating plate.

Each arm 16 and insulating plate 28 is formed with registering apertures indicated at 39 so that heating member 34 may be extended through aperture 39 with the free end lying within tubular arm 16, as shown in Fig. 4. The illustration in Fig. 4 shows the end of heating member 34 at the left-hand end of the machine connected to two of three terminals 40 secured to terminal plate 41 mounted in transversely extending relation within the arm 16 at the left-hand side of the machine.

Holder 31 is formed at the left-hand end, as shown in Fig. 4 with a bore 42 aligned with a portion of apertures 39 in insulating plate 28 and arm 16 to receive a thermostat control unit 43 responsive to the temperature of holder 31 having the terminals thereof connected to terminal plate 41 with the outer end portion of the unit extending through aperture 39 into the inner portion of tubular arm 16. This provides for suitable terminal connections with terminal plate 41 that are arranged in accessible relation within the tubular arm through the opening in the outer side thereof. The heating member 34, as illustrated in the drawings, is preferably a conventional electric heating member of suitable form, the construction of which is not illustrated. The terminals 40 thereon are electrical terminals for the circuit in the heating member and the thermostatic control unit 43 is an electrical control unit of suitable construction, well-known in the art.

With the heating member and control unit connected to terminal plate 41, it will be clear that circuit connections to both may be readily made through suitable supply connections with terminal plate 41 for supplying electricity from a suitable source of power. For this purpose, the electric wiring indicated at 44, supplies the connections for the heating medium. Electric wires 44 are mounted in and extend through tubular arm 16 at the left-hand side of the machine to a suitable switch control unit 45 mounted in the upper rear portion of the left-hand blade mounting arm 16, as shown in Fig. 1. The wiring from switch control unit 45 extends downwardly through the open rear end of the tubular arm into base 1 of the machine where, through the medium of a suitable cable connection, the heating member and thermostat control may be electrically connected with a source of electric current. An adjustable thermostat 43 of suitable conventional form may be used so that it will operate to control the circuit to heating member 34 in a manner to secure the heating of the creasing blade to a desired temperature for the forming operation of the machine.

A guard 46 in the form of a strip of imperforate sheet metal is formed into substantially U-shape to embrace holder 31 in spaced relation, as shown in Figs. 3, 4 and 7, with the free edges arranged in spaced parallel relation to provide a slot at one side thereof through which the free margin of creasing strip 36 projects. The ends of guard 46 are engaged on guard mounting seat 26, as shown in Fig. 4 to rigidly support the guard in position to normally prevent an operator from coming in contact with heated holder 31 and heating member 34.

By varying the position of eccentrically mounted bearing sleeves 19 on rod 21, relative to supporting members 11, the position of the forming edge of creasing strip 35 of creasing blade 30 may be adjusted. In this way, the forming edge of creasing strip 35 may be arranged by adjustment of the pivot for the arms so as to uniformly contact the surface of the creasing pad with substantially uniform pressure as the blade is moved into creasing cooperation with the pad. In addition, the position at which the edge of creasing strip 35 engages the creasing pad, may be adjusted within the limits of the bearing sleeve 19 which will control and vary the forming cooperation of the creasing strip with the pad so the edge of creasing strip 35 will engage in the bottom of the groove in pad 14. The resilient strip 14″ cooperates to obtain a uniform pressure between the creasing strip and pad 14 through the length thereof during the folding or creasing operation.

A tension spring 47 has one end anchored to a projecting portion on supporting member 11 and the opposite end secured to a depending portion of tubular arm 16 extending below bearing rod 21 in the manner shown in Fig. 1. Two springs are used, one for each arm, which normally operate to move the arm in a counterclockwise direction, as shown in Fig. 1, and thereby normally hold the creasing blade in elevated inoperative position.

A gauge bar 48 is slidably mounted on the top face of top plate 15 between arm 16, as shown in Fig. 2, to provide a means for limiting the position of a sheet to be formed on the top of the machine over the creasing pad so that the creasing operation may be formed in the desired position on the sheet. Manually operable guide and retaining members 49 engaged in slots formed in top plate 15, are operable to guide gauge bar 48 and are secured in a desired position of adjustment.

Blade moving means for operating the movable blade toward and from the creasing pad is provided, so arranged that by the uniform movement of an operating lever, the movable creasing blade is first moved at a rapid rate toward the creasing pad and then, during the creasing operation, the blade is moved at a slow rate while engaging a sheet against the creasing pad and forming it through the exertion of substantial pressure during the forming operation without materially increasing the force required in operating the operating lever in a substantially uniform manner. For this purpose, an operating lever 50 is mounted in the central portion on a shaft 51 journalled at its opposite ends in the forward portion of supporting members 11. Pedals 52 are mounted in laterally extended relation on opposite sides at the lower end of operating lever 50, in the manner clearly shown in Figs. 1 and 2, so that an operator may place one or both feet on pedals 52 to manually operate lever 50 in producing a creasing operation of the machine in a manner that will be hereinafter described. An actuator shaft 53 has opposite ends journalled in suporting members 11 and adjacent the outer faces of members 11, carries an actuating arm 54 on each end thereof rigidly secured to the shaft for rotation therewith.

A toggle 55 connects actuator shaft 53 with operating lever 50 by means of an arm 56 mounted at one end on shaft 53 and extending laterally from the central portion thereof, having link 57 pivotally connected at one end to the free end thereof, with the opposite end pivotally connected to operating lever 50 at 58, a point spaced the desired distance from the mounting of the operating lever on shaft 51 to secure effective operation of the creasing blade.

Actuating arm 54 has the outer end formed with a return bend portion, indicated at 59 in Fig. 2, to receive opposite ends of a pivot pin pivotally mounting one end of a link 60 on the pivot pin between the outer end of the arm and the return bend. The opposite end of link 60 is pivotally connected to pivot pin 61 extending transversely between the inner and outer side walls of tubular arm 16 at a point intermediate the creasing blade and bearing sleeve 19. Two links 60 are used, one connecting each actuating arm 54 to the respective blade supporting arm at each end of the machine. Actuating arm 54 is also provided with a lateral extension 62 projecting downwardly, as shown in Fig. 1 carrying an adjustable stop pin 63 arranged to engage lateral projection 64 on supporting member 11 to which one end of each spring 47 is anchored. This limits the movement of actuating arm 54 in a clockwise direction as actuator shaft 53 is rotated through the movement of operating lever 50 from the position shown in Fig. 1 toward the rear side of the machine.

Actuating arm 54 and arm 56 of toggle 55 are mounted on actuator shaft 53 in an angular relation of about 30° relative to each other, as shown in Fig. 1. When toggle 55 is substantially straight, as shown in Fig. 1, actuating arms 54, one at each end of actuator shaft 53 will lie in a position approaching the horizontal. The distance for the pivotal mounting of link 60 on actuating arm 54 from shaft 53 is about half the distance between the pivotal connection on pin 61 of blade supporting arm 16 and bearing sleeve 19 thereof.

This arrangement of the operating means for moving the blade with the operating lever, the actuating arm and the link, positioned as shown in Fig. 1, with the blade mounting arms and creasing blade in the upper inoperative position, the machine is ready for operation as soon as the blade has been heated to the desired operating temperature. This is obviously secured by operating switch unit 45 to close the circuit to the heater element in the blade sufficiently in advance of the time that it is desired to operate the machine for a creasing operation to allow the creasing blade to become heated. The gauge bar 48 is adjusted to the desired position for the crease to be formed in a sheet of material and clamped in place. Then, the operator moves a rectangular sheet of material over the upper face of work table 12 and top plate 15 until the rear edge engages the forward edge of gauge bar 48 arranging the sheet in position for creasing.

The operator then applies foot pressure to pedal 52 to move operating lever 50 rearwardly toward the rear wall of the machine. This may be done with a substantially uniform pressure and uniform speed of operation. With this uniform movement and during the first portion of the movement of operating lever 50, blade supporting arms 16 are operated to move the creasing blade at a rapid rate toward creasing pad 14 while the pivot connection of link 60 to actuating arm 54 moves in an arcuate path. It will be noted that in the first portion of its movement downward in the position shown in Fig. 1, arm 54 will move link 60 more directly downward and thereby produce the rapid downward movement of the creasing blade toward the pad. Then, as actuating arms 54 approach the lower portion of the arc of movement about shaft 53 in the rotation thereof, it will be noted that the pivotal connection of link 60 therewith moves in a path that becomes increasingly more horizontal and less vertical, thereby reducing the downward speed of movement of the creasing blade as the pivot for link 60 moves toward dead center position.

The proportion of the parts of the operating mechanism including actuating arms 54, links 60 and the pivotal connections of links 60 with the actuating arms and the blade supporting arms, is arranged in such a manner that the forming edge of creasing strip 35 will engage the upper edge of the sheet to be creased before the pivot connections of links 60 on actuating arms 54 reach the dead center position. This obtains a movement of the creasing strip after it engages the sheet to be formed so that the strip moves from the position shown in Fig. 5 to that shown in Fig. 6 to bend the sheet to be creased or folded between the two spaced parallel top portions of creasing pad 14 at opposite sides of the groove therein downwardly in the groove in pad 14. That is, the creasing blade moves downwardly at a rapid rate and slows down as it approaches the creasing pad, having the lower edge of the creasing strip engage the upper face of a sheet to be formed, as shown in Fig. 5. Then, the subsequent movement of the lever mechanism with the motion of actuating arms 54 into substantially dead center position, secures an additional downward movement of the creasing strip 35 to bend or fold the sheet to be formed into the groove in the creasing pad, in the manner shown in Fig. 6.

It will be clear that when actuating arms 54 approach dead center position for the pivot with links 60, a substantial amount of pressure is exerted upon blade supporting arms 16 to force the creasing strip into the bottom of the groove in creasing pad 14 when strip 14" is compressed by pad 14 to a limited extent without an added increase in the amount of pressure required for moving operating lever 50. This secures the desired pressure for forming the sheet with portions at opposite sides of creasing strip 35 extending in angular relation, as shown in Fig. 6. In this forming operation, creasing pad 14, through its resilient support on strip 14" receives the fold in the sheet in the bottom of the groove therein with strip 35 heating only the fold portion of the sheet so the plastic material will flow freely into the sharply curved portion.

The heated creasing strip softens the plastic material of the sheet being formed to allow for the creasing of the sheet in a permanent manner so that after the crease is formed and the creasing blade elevated to the position shown in Fig. 1, the plastic material will be cooled and permanently retain the crease formed therein by the metal of pad 14 at the bottom of the groove absorbing the heat rapidly as soon as the creasing blade is removed from the fold. When blade supporting arms 16 have been moved downwardly to engage creasing strip 35 in the compressed forming cooperative position at the bottom of the groove in creasing pad 14, as shown in Fig. 6, stop pin 63 on actuating arm 54 will engage lateral projection 64 on supporting members 11 and limit the further operation of the movable creasing blade. The operator then moves the operating lever 50 back to the starting position shown in Fig. 1 at a substantially uniform rate of speed which will return the parts by reverse operation into the position of Fig. 1. By operating the operating lever 50 rearwardly and forwardly at a substantially uniform speed, the creasing blade will be operated in the desired timed relation to engage and hold creasing blade 35 in engagement with the sheet to be formed and bend or fold the same into pad 14 a length of time sufficient to provide for the heating of the material that will secure the permanent creasing of the sheet with the portions at opposite sides of the blade extending in the angular relation shown in Fig. 6. As operating lever 50 is moved from the rear to the forward position shown in Fig. 1, arms 16 and creasing blade 35 will first be slowly moved from the full cooperative creasing position with creasing pad 14, shown in Fig. 6, and then quickly moved to the inoperative position in a manner that is the reverse of the operation secured in moving operating lever 50 from the forward position toward the rear.

The position of supporting members 11 to reinforce the sheet metal base structure provides a simple and efficient structure that is inexpensive to manufacture for mounting the creasing pad and blade. At the same time, supporting members 11 provide bearings for mounting the several moving parts of the operating mechanism including the blade supporting arms, to facilitate assembly of the parts, as well as a structure in which the parts are mounted in a fixed relation controlled by the supporting member subject to the adjustment provided by the operation of sleeve bearings 19. In this way, a creasing machine is produced that is economical to manufacture and efficient in operation due to the rapid blade movement toward and from the position where it engages and forms a sheet in cooperation with the creasing pad.

The invention claimed is:

1. A plastic creasing machine comprising a creasing pad, a thin creasing blade having an edge engageable with said pad with the sides spaced therefrom, means normally supporting said blade in spaced parallel relation to said pad and operable for initially moving said blade rapidly toward said pad and then slowly moving said blade when near said pad to engage an edge on said blade with a sheet and form a crease along said edge by compression against said pad the remainder of said sheet being spaced from said blade, and means for automatically heating only said blade to a predetermined temperature for cooperation to form a crease in a sheet during compressed engagement between said blade and pad.

2. A plastic creasing machine comprising a creasing pad having a groove formed in longitudinal extending relation therein, a creasing blade having the sides spaced from said pad when an edge is engaged with the pad in said groove, spaced parallel supporting members having opposite ends of said pad secured thereto, spaced parallel blade mounting arms pivotally mounted at one end on said supporting members in spaced relation to the mounting for said pad and having opposite ends of said blade secured to the free ends thereof, heat insulating means between the ends of said blade and said arms and forming a support on said arms for said blade, means for heating only said blade to a predetermined temperature, and means mounted on said supporting members of initially moving said blade rapidly toward and from said pad and subsequently moving said blade slowly to engage an edge of said blade with a sheet of material and fold said sheet into the groove in said pad to form a crease therein during said slow movement with heating of the sheet by said blade along only the edge of said blade at said crease.

3. A plastic creasing machine comprising a creasing blade, a creasing pad, pivoted blade mounting arms for supporting said blade for movement to and from said pad, a pivoted actuating arm, a link pivotally connected at opposite ends to said blade mounting and actuating arms respectively, the distance of the pivotal connection of said link to the pivot of said blade mounting arm being substantially double the distance between the pivotal connection of the link to said actuating arm and the pivotal mounting thereof, an operating lever and means for operating said actuating arm in uniform movement of said operating lever to move said blade to and from said creasing pad at a rapid rate by movement of said actuating arm from a laterally extending position toward dead center position and then moving said blade at a slow rate during creasing of a sheet in cooperation with said pad as said actuating arm approaches dead center position.

4. A plastic creasing machine comprising a base, a pair of spaced parallel supporting members mounted on the top portion of said base in transversely extending relation, a creasing pad mounted above and in laterally extending relation with opposite ends secured to said members and in longitudinally extending relation to said base, a pair of blade mounting arms each pivoted at the rear end to the rear end of one of said supporting members with the forward ends extending above said supporting members in spaced parallel relation over said creasing pad, a creasing blade extending between said arms over said pad in substantially parallel relation thereto having an edge directed toward said pad, heat insulating members secured to the ends of said blade and carried by said arms for mounting said blade thereon, means for heating said blade, means for normally maintaining said blade in a position spaced above said pad and manually operable means carried by said supporting members for moving the edge of said blade into cooperation with said pad for engaging a sheet against said pad under pressure for forming a crease therein.

5. A plastic creasing machine comprising spaced supporting members, a pair of bearings each journalled on one of said supporting members and having portions in eccentric relation thereto, blade mounting arms, each rotatably mounted at one end on said portions of one of said bearings, a creasing blade having each end secured to the free end of one of said supporting arms and extending between said arms in transverse relation, a creasing pad carried by said members in aligned substantially parallel relation to said blade for engagement thereby, said bearings being independently rotatable for changing the eccentric relation of said portions on said supporting members and moving the pivot of each arm relative to each said supporting member for changing the angular engaged cooperative position of the blade relative to the pad, and means for moving said blade toward and from said pad with the movement of said arms on said bearings for cooperation with said pad to engage and crease sheet material therebetween.

6. A plastic creasing machine comprising spaced supporting members, a pair of blade mounting arms, means pivotally mounting said arms on said members for independent adjustment of the pivots relative to each other and said members, a creasing pad mounted on said supporting members, a creasing blade extending between and having each end secured to one of said blade mounting arms in position for movement into engagement with said pad for creasing cooperation, and means for moving said creasing blade toward said pad for engaging and creasing a sheet therebetween, said first mentioned means mounting said arms being independently operable to vary the alignment of said blade with said pad for varying the creasing operation thereof.

7. A plastic creasing machine comprising supporting means, a creasing pad mounted on said means, a pair of tubular blade mounting arms, each arm having a bottom opening at one end and a blade mounting seat at the opposite end on the inner side portion, bearing members mounted on the first-mentioned ends of said arms for pivotally mounting said arms on said supporting means, a creasing blade, a pair of insulating plates, one mounted on each end of said creasing blade, means detachably mounting said insulating plates on said blade mounting seat of said arms, and means for oscillating said arms and blade toward and from said creasing pad for cooperation with said pad to crease sheet material.

8. A plastic creasing machine comprising supporting means, a creasing pad mounted on said means, a pair of tubular blade mounting arms, means on one end of each arm pivotally mounting said arms on said supporting means in spaced relation to said pad, with the opposite ends of said arms extending over said pad, a creasing blade having a holder formed with slots extending longitudinally along opposite edges, and a creasing strip having one margin mounted in one of said slots with the opposite margin forming a creasing edge, a pair of insulating members mounted on opposite ends of said holder and each detachably secured to the opposite end of one of said arms for mounting said blade in laterally extending relation between said arms in position for creasing cooperation of said creasing strip with said creasing pad, a heating member mounted in the other of said slots in said holder and having one end extending through an aperture in one of said blade mounting arms into the interior of said arm for receiving connections therein to supply a heating medium to said heating member, and means for oscillating said arms and blade toward and from said creasing pad for cooperation with said pad to crease sheet material.

9. In a plastic creasing machine, a creasing blade structure and mounting comprising a pair of spaced parallel blade mounting arms, a creasing blade having a holder extending between and detachably secured to said arms at one end thereof, said holder having longitudinal recesses formed in opposite marginal portions, a creasing strip having a margin mounted on said blade in one recess, a heating member extending longitudinally of said holder in the other of said recesses therein and having connections with a heating medium supply at an end thereof carried by one of said arms, and a guard enclosing said holder in spaced relation thereto extending between and mounted on said arms.

10. In a plastic creasing machine, a pair of spaced parallel blade mounting arms, a creasing blade extending between and mounted at opposite ends on said arms, a heating member extending longitudinally of and mounted on said creasing blade, a heating medium supply means carried by one of said arms and connected to one end of said heating member, and a guard embracing all but a marginal portion of said creasing blade including said heating member arranged in spaced relation thereto and having opposite ends mounted on said arms.

11. In a plastic creasing machine, a pair of spaced parallel blade mounting arms having blade mounting seats and guard mounting seats on one end of each arm, insulating plates mounted one in each of said blade mounting seats, a holder formed with slots in opposite margins having opposite ends secured to said insulating plates and extending transversely between said arms, a heating member mounted in one of said slots extending longitudinally throughout the length of said holder and having one end extending through an aperture in one of said arms and insulating plate thereon in spaced relation thereto for receiving connections with a heating medium supply means carried by said last-mentioned arm, a guard of imperforate material embracing said holder in spaced relation thereto extending between said arms, mounted on said guard mounting seats and having a slot extending longitudinally along the other slotted margin of said holder, and a creasing blade having a margin mounted in said other slotted margin of said holder and having the free margin projecting outwardly through the slot in said guard.

12. In a plastic creasing machine, a pair of spaced parallel tubular blade mounting arms having blade mounting seats formed on the inner sides thereof at one end, a creasing blade extending between said arms and mounted on said seats, a heating member in said blade having an end extending through an aperture in one of said arms into the interior of said one arm, a terminal plate mounted in said one arm adjacent the end of said heating member therein and having the terminals of said heating member connected thereto, a thermostat control unit mounted in said creasing blade extending into said one arm and having terminals secured to said terminal plate, and heating supply means for said heating member mounted in said one tubular arm and connected to said terminal plate, said heating member and said thermostat control unit.

13. A plastic creasing machine comprising a base formed with a top portion having a work table across the front of said base and a channel at the rear edge of said work table, resilient means mounted in the bottom of said channel, a creasing bar mounted in said channel on top of said resilient means for vertical movement, said creasing bar having a groove in the upper face, extending longitudinally thereof and forming spaced parallel supporting ledges at opposite sides of said groove, a creasing blade having a narrow forming edge, means on said base below said table movably mounting said creasing blade in edgewise relation above said creasing bar with said forming edge aligned with said groove in said creasing bar, an operating lever pivotally mounted at one end in said base below said work table and having the other end extending downwardly from the pivot for manual engagement and operation, means mounted on said base below said work table and connected with said operating lever and blade mounting means for transmitting movement of said operating lever to move said blade toward and from said creasing bar, and means for heating only said blade whereby manual movement of said operating lever in one direction will move said blade toward said bar for engaging a sheet supported on said work table and bar between said ledges for folding said sheet about said forming edge of said blade in spaced relation to the sides thereof and into said groove in said bar, in downward movement of said blade until said forming edge engages said sheet against the bar at the bottom of said groove with said bar having cushioned movement against said resilient means to complete formation of a crease in said sheet, said bar absorbing heat from the crease in said sheet as said blade is moved away from said bar by said operating lever being moved in an opposite direction toward its initial position.

RALPH F. TABER.

REFERENCES CITED

The following references are of record in the file of this patent:

UNITED STATES PATENTS

| Number | Name | Date |
|---|---|---|
| 529,192 | Remus | Nov. 13, 1894 |
| 1,403,826 | Andree | Jan. 17, 1922 |
| 1,537,533 | Jannell | May 12, 1925 |
| 1,655,124 | Ballard | Jan. 3, 1928 |
| 2,059,883 | MacBeth | Nov. 3, 1936 |
| 2,114,621 | Berstein | Apr. 19, 1938 |
| 2,260,667 | Hoof | Oct. 28, 1941 |
| 2,304,663 | Smith et al. | Dec. 8, 1942 |
| 2,309,496 | Bird et al. | Jan. 26, 1943 |
| 2,339,304 | Von Haase | Jan. 18, 1944 |
| 2,431,353 | Varner et al. | Nov. 25, 1947 |